United States Patent [19]

Koberstein et al.

[11] 3,873,471
[45] Mar. 25, 1975

[54] CATALYSTS AND THEIR PRODUCTION

[75] Inventors: Edgar Koberstein, Alzenau; Eduard Lakatos, Grossenhausen, both of Germany

[73] Assignee: Deutsche Gold-und-Silber-Scheideanstalt Vormals Roessler, Frankfurt, Germany

[22] Filed: Mar. 23, 1973

[21] Appl. No.: 344,458

[30] Foreign Application Priority Data
Mar. 25, 1972 Germany............................ 2214797

[52] U.S. Cl........ 252/465, 252/466 PT, 252/477 R, 423/213.2, 423/213.5
[51] Int. Cl. ......................... B01j 11/08, B01j 11/22
[58] Field of Search..................... 252/465, 466 PT; 423/213.2, 213.5

[56] References Cited
UNITED STATES PATENTS
3,669,906  6/1972  Koberstein et al................... 252/465
3,741,725  6/1973  Graham ........................... 423/213.5
3,787,322  1/1974  Koberstein et al................. 252/465

FOREIGN PATENTS OR APPLICATIONS
1,283,247  11/1968  Germany ........................... 252/465
1,544,012  6/1969  Germany

*Primary Examiner*—Winston A. Douglas
*Assistant Examiner*—W. J. Shine

[57] ABSTRACT

Catalyst for the purification of pollutant exhaust gases produced by industrial processes and motor vehicles, by conversion of impurities contained therein to carbon dioxide and water and removal of nitrogen oxides at elevated temperatures in contact with air, comprises a hard-baked mixture of eta and gamma aluminum oxide and a mix of the oxides of chromium and at least one element of the first transition series, wherein the chromium oxide and oxide of the element of the First Transition Series comprises more than 50% by weight of the mixture with aluminum oxide. The catalyst may take the form of molded bodies which bodies are formed completely of catalytically active aluminum oxides containing said oxides of chromium and of an element of the First Transition Series.

15 Claims, No Drawings

CATALYSTS AND THEIR PRODUCTION

BACKGROUND OF THE INVENTION

This invention relates to an oxidation catalyst for use at high temperatures, particularly for use in the purification of exhaust gases issuing from motor vehicle engines and from industrial plants, and is directed to the method for the production of said catalyst.

A catalyst designed to oxidize the harmful exhaust components and to convert them into harmless carbon dioxide and steam before they are ejected into the air should, to be effective and viable commercially, satisfy a number of apparently conflicting requirements, especially when employed in the exhaust systems of motor vehicles. Firstly, the catalyst should initiate the oxidation at as low a temperature as possible. Secondly, the catalyst should convert a high percentage of the combustible substances into carbon dioxide and steam over the wide range of temperatures and rates of gaseous throughput involved. Thirdly, it should be stable enough to retain activity over an extended period of use to avoid the need to replace the catalyst often. Fourthly, it should be solid enough to endure the severe mechanical stresses and thermal variations occurring during extended periods of use. Lastly, the catalyst should not be poisoned by compounds present in the exhaust gases, such as sulphur, phosphorus and lead, which are known to be catalyst poisons.

Catalysts containing aluminum oxide, copper oxide and chromium oxide vary in their suitability for use under the conditions described above depending on their composition and also by reason of process steps used in their manufacture which may not be apparent from the composition or construction of the catalysts so produced. In known catalysts containing alumina and oxides of copper and chromium, the alumina is a support, the oxides of copper and chromium being, for example, impregnated, absorbed or precipitated on the alumina. Many of such catalyst systems do not fulfill one or more of the requirements for a successful catalyst as stated above and particularly do not retain activity during extended periods of use, particularly at high temperatures.

Experiments show that such carrier catalysts containing the usual amounts of heavy metal oxides; e.g., 5 to 20 weight percent based on total catalyst weight, as well as catalysts as shown by U.S. Pat. No. 3,291,564 to Kearby, which are impregnated with higher amounts of heavy metal oxides, e.g., up to 37% based on the total catalyst weight, failed high mileage automotive exhaust gas purification tests either due to fast solid state reaction between heavy metal oxide and carrier at temperatures above 800°C. or due to a reduction in mechanical strength caused by the conditions involved.

Catalysts comprising an alumina support having a copper oxide/chromium oxide coating generally do not meet the high temperature requirements which can be encountered in a catalytic after-combustion of motor vehicle exhaust gases. The following test is presented as an illustration of such facts.

A catalyst was prepared according to Example 1 of U.S. Pat. No. 3,291,564. Alumina was mixed with aqueous solutions containing 5.0 moles $BaCl_2$ per 100 moles $Al_2O_3$. The wet pastes were dried and calcined 16 hours at 1,600°F. The $BaCl_2$ stabilized product was thoroughly washed with water. The analysis of the water-washed stabilized product showed a BaO content of 3.8% in accordance with the analysis given at Table 1 of the above-cited patent. The catalyst was made by impregnating the stabilized alumina with 30.4% of $Cr_2O_3$, added as a $CrO_3$ solution, and 20% CuO based on the weight of the stabilized $Al_2O_3$ carrier to form thick pastes, which were then dried and calcined at 1,200°F. for 6 hours.

This catalyst was subjected to tests according to the "California Test Procedure and Criteria for the Motor Vehicle Exhaust Emission Control Board." The following results were obtained:

TABLE I

| DISTANCE COVERED (Km) | Conversion of Hydrocarbons After 4th Deceleration |
|---|---|
| 0 | 90% |
| 5000 | 77% |
| 10000 | 70% |
| 20000 | 37% |
| Experiments discontinued. | |

The figure of 37% hydrocarbon conversion is unsatisfactory and the catalyst would have to be replaced before this degree of deterioration had occurred.

Where the aluminum oxide acts merely as a support or carrier for increased amounts of heavy metal oxides, as in the catalyst test above, the vibration of the vehicle at the intermittent pressure variations in the exhaust gases escaping from the engine may cause the essential bond between carrier and coating to be ruptured. Such catalysts do not fulfill the mechanical requirements necessary for practical use.

To illustrate the decomposition of such catalysts under the effect of vehicle vibrations and pressure variation, alumina in tablet form (diameter 2 mm. height 3 mm.) was impregnated with copper salts and chromium salts from aqueous solutions and tempered up to a final temperature of 750°C. The catalyst then consisted of 55% by weight copper chromium oxide in a ratio of 2 $CuO/Cr_2O_3$ on an alumina support. The crushing strength of the original tablets was compared with that of the impregnated catalysts, as set forth below.

TABLE II

| | CRUSHING STRENGTH (KP) |
|---|---|
| Original $Al_2O_3$ tablets | 10–13 |
| $Al_2O_3$ tablets with 55% by weight copper, chromium oxide | less than 1 |

The surface area of the types of carrier catalysts mentioned above is comparatively large. The same is true of catalysts described in the literature where a finely divided heavy metal component with particle sizes below, for example, 1,000 Angstroms is combined with an interspersing refractory material of the same particle size to separate heavy metal oxide catalyst crystallites and to prevent crystallite growth.

It has been known to use carrier catalysts, coated with active components, in the form of pellets, tablets, or extruded articles for the catalytic purification of automobile or industrial exhaust gases. In these types of catalyst systems, as stated above with respect to other catalyst systems, it has been discovered that the catalytically active layer applied to the carrier can become ineffective because of high temperatures occurring as a result of solids state reactions with the carrier material.

Other exhaust catalyst systems have been proposed, which contain oxidic heavy metal compounds in mixture, with substances which constitute carrier materials, as in German Pat. No. 1,283,247. To decrease the influence of solid state reactions, a heavy concentration of the heavy metal compounds was found to be necessary. The prior art molded catalyst bodies, as, for example, the prior art tablets, pellets or extruded articles, have revealed that they are subject to a relatively high flow resistance in the catalytic purification installations. Such prior art catalyst systems, when employed in exhaust gas catalytic purification systems, are subjected to additional stresses, caused by the vibrations of the exhaust gas column in the exhaust pipe, which can cause a considerable downward pressure in the catalyst distribution.

The prior art has disclosed carrier skeletons with channels of various shapes and sizes passing through them, and made of ceramic substances, such as glasses, borosilicates, sodium silicates, lead silicates, alumina-containing silicates, earth alkaline silicates, or fire resistant masses, such as sillimanite, magnesium silicates, magnesia, zircon, zirconia, petallite, spodumene, cordierite, corundum and alumina silicates, as well as glass-ceramic masses. In particular, German published application DAS 1,097,344 discloses such carriers which contain surface coatings of catalytically active materials.

Furthermore, German application laid open for public inspection DOS No. 1,544,012 teaches catalytic purification of exhaust gases, by conducting exhaust gases in the presence of oxygen at reaction temperature, through gas channels in a platinum catalyst, which extend through a carrier catalyst, which consists of an inert, porous, heat resistant carrier skeleton, which catalyst is located on the surface of the canals and at the surface of accessible macropores connected with the canals. Such a system obviates the disadvantages of pilings or beds of carrier catalysts, previously set forth. However, these carrier skeleton catalysts do not obviate the disadvantage of solid state reaction and recrystallization effects when employed at elevated temperatures.

In accordance with the invention set forth in the claims, it has been discovered that the advantages of mixed catalysts can be combined with the advantages of carrier skeleton catalysts, without impairment of mechanical stability. The invention resides in employing as the carrier skeleton a catalytically active carrier. Thus, the invention resides in forming a carrier skeleton of catalytically active carrier in the presence of exhaust gas catalysts. The invention is concerned with a product, the process of forming such catalytically active carrier skeleton bearing catalysts, and with the process for the purification of organic compounds, carbon monoxide and nitrogen oxides contained in exhaust gases from internal combustion engines and industrial plants. particularly, the products of the instant invention comprise molded bodies, formed of mixtures of catalytically active carriers in the presence of exhaust gas catalysts. Such molded bodies are formed in a manner such that the molded bodies are penetrated by flow-paths, through which exhaust gas masses containing undesirable contaminants may flow.

The invention will be more fully understood by the following description of a preferred embodiment. While the invention will be described in connection with a preferred embodiment and process, it will be understood that it is not intended to limit the invention to that embodiment and procedure. On the contrary, it is intended to cover all alternatives, modifications, and equivalents that may be included within the spirit and scope of the invention as defined by the appended claims.

As stated above, the catalyst compositions discovered by applicants take the form of molded bodies through which flow paths penetrate. These flow-paths constitute voids or channels through which exhaust gases may penetrate and be subjected to catalytic conversion. As set forth in the following description, molded bodies will be understood to include the terms catalytic elements, molded catalyst bodies, and packing or stuffing.

The molded bodies of this invention are formed of a catalytically active carrier substance mixed with an oxide of chromium and oxides of at least one element of the First Transition Series of the Periodic Table. As set forth herein, elements of the First Transition Series are defined to include the elements, vanadium, manganese, iron, cobalt, nickel or copper.

In particular, the catalytic reactive carrier substance is defined to comprise eta and gamma-aluminum oxides and mixtures thereof. Said catalytically active carriers substance are formed conventionally or prepared by precipitating hydrous alumina gel and thereafter drying and calcining at elevated temperatures, particularly above 300°C and in the range of 300°-1,000°C. The molded, hard-baked mixture of the catalytically active carrier substance with the oxides of chromium and elements of the First Transition Series comprises a composition wherein the mixture of chromium oxides and oxides of the First Transition Series comprises more than 50% by weight of the mixture of catalytically active carrier substance and said oxides.

These molded bodies are formed by preparing an oxide mixture containing a chromium oxide and an oxide of at least one element of the First Transition Series. Said oxide mixture is then further mixed with aluminum oxide which is catalytically active in the final product. As stated above, the terminology "catalytically active" is meant to include eta and gamma alumina and mixtures thereof. These mixtures are processed. They are then mixed with conventional auxiliary binders employed in molding compositions. The binder and mixture of oxides is subjected to molding processes such that discrete elements of said compositions are produced, which discrete elements contain at least one flow-path, void or channel. These discrete bodies are dried and calcined. As stated above, it is critical that the ratio of aluminum oxide to the ratio of the mixture of chromium oxide and oxides or elements of the First Transition Series be less than one. Or in other words, that the mixture of chromium oxide and oxides or elements of the First Transition Series comprise more than 50% by weight of the compositions containing aluminum oxide, chromium oxide and oxides of elements of the First Transition Series. In fact, it is preferred that the chromium oxide-mixture containing oxides of elements of the First Transition Series comprise between 55% to less than 90% by weight, and preferably less than 80%, of the aluminum oxide and chromium oxide and oxides of the elements of the First Transition Series. Excellent results were obtained when the chromium oxide and oxides of elements of the First Transition Series comprises 70% by weight of said mixture.

Once the compositions of this reference have been molded into discrete bodies, characterized as possessing at least one flow-path, it is within the scope of the invention to impregnate such catalytic bodies with another catalytically active substance. In particular, such processed molded bodies may be subjected to impregnations of noble metals as noble metal compounds and salts and/or impregnations with another compound of a second element of the First Transition Series. Ultimately, in the final product, the second impregnant is present as oxides of said noble metal or of said second element of the First Transition Series or of noble metal. Practically, various methods may be employed to impregnate said molded bodies with a second impregnant. It has been found convenient to employ aqueous solutions of salts of the respective second impregnant. After such aqueous impregnation, the impregnated molded body is dried and then heated at 400°C. The noble metal impregnant may be present in the final product no more than, or less than, 1% by weight of the other catalytically active components, including the catalytically active aluminum oxide. Preferably, impregnation results in the presence of noble metals in the ultimate product in a range between 0.1 and 0.5% by weight of the catalytically active substances of the molded body. It is understood that the terminology "noble metal" includes palladium, platinum, rhodium, iridium, ruthinium and mixtures thereof.

The ultimate molded catalyst bodies used in the process of the invention thus represent monolithic systems with a composition of a mixed catalyst. Canals of any shape and arrangement can pass through them. These molded bodies are employed in exhaust gas purifying apparatuses. In employing these molded bodies, a packing or stuffing of a plurality of said molded bodies will create connected paths for the gas between the entry point for the exhaust gas and the exit point for the exhaust gas in such an arrangement.

The development of canals in the monolithic catalytic elements is afforded by known and suitable processes. After a mixture of the aluminum oxide and chromium oxide in the presence of oxides of elements of the First Transition Series are prepared, the mixtures of said substances are pulverized to grain sizes of less than 60 microns and then to grain sizes below 50 microns. These pulverized mixtures are then processed with conventional binders employed in molding, for instance, graphite, metal oxides stearic acid, tylose, tragacanth, starch and/or organic binders, for example, gum arabic, colophonium, acrylic resins, alkyd resins, phenol resins. Mixtures of these conventional binders and the catalytic reactive components are then molded. While various processes of molding may be employed, it has been found extremely convenient to mold by means of extrudation. Mixtures of the catalytically active components and binders are extruded by means of an extruder, the extruder head of which in its cross-section has a multiple mandrel arrangement, in that the extruded strand is pre-dried, sub-divided in suitable lengths, and then finally dried and finally calcined, or re-heated. A detailed process of forming the catalytic bodies of this invention is set forth below.

A composition of the exhaust gas catalyst is prepared by reacting a chromium compound, particularly a salt with a compound, particularly a salt of an element of the First Transition Series in aqueous solutions, said salts being preferably inorganic salts. The two metal compounds are allowed to react until a product precipitates. The product precipitate is separated by conventional means; separation is conveniently effected by filtration. Thereafter, the product precipitate is air-dried by evaporation. Drying may require heating at 10 hours at temperatures ranging between 110° and 140°C. After drying, the precipitate product is comminuted or pulverized. After pulverizing, the precipitate is calcined by heating for one hour at temperatures between 300° and 450°C., preferably between 150° and 400°C. Heating may be undertaken in a muffle furnace. Thereafter, the pulverizate which has been subjected to elevated temperatures is ground to grain sizes of less than 60 microns.

After such grinding procedure, the precipitate of chromium and said element of the First Transition Series is mixed with aluminum oxide. Usually, aluminum oxide is in the form of an aluminum press cake which contains 6.7% by weight $Al_2O_3$ solids. Usually the aluminum oxide and mixture of chromium oxides and oxides of elements of the First Transition Series are prepared in the form of a paste. The paste is mixed and homogenized. After mixing and homogenization, the paste is dried, broken by sifting, and is then ground. The ground material is comminuted to particle sizes less than 70 microns. The dried paste is ground to grain sizes below 60 microns and preferably below 50 microns.

The ground or pulverized aluminum oxide-chromium oxide-oxidic compound of an element of a First Transition Series is then mixed with the conventional binders enumerated above. The binder mixtures containing catalytically active components are then molded. As stated above, molding is preferably undertaken by extruding. While particular details of extruding said compositions are set forth in the following examples, it is not meant to be restricted to the particulars of said examples, since the invention does not reside in extruding the catalytically active mixture, but in the concept of molding said compositions. In particular, the invention resides in the product and the process and in the use of molded bodies comprised of completely catalytically active compositions.

By way of convenience, we will describe the catalyst element in terms of an extrudate. The catalyst element obtained by extrusion, has canals corresponding to selected mandrel arrangement of the extruder head, as more fully described in the examples, which constitute the flow paths for the exhaust gas that is to be purified. Canals of any cross-section may be produced by the selection of correspondingly shaped bodies.

However, it is within the purview of this invention to apply the above-mentioned starting mixture for the catalyst to both sides of organic supports, then to corrugate or profile them. Then in a suitable reaction with additional supports, such bodies or supports may be laminated into a honeycomb-like body. Such a structure or body may be dried and annealed, whereby the support used as an auxiliary means for the mold burns up and and mixed catalyst element flowing through individual flow-paths, remains.

While the invention will be more fully explained in the following pages comprising the experimental basis for this invention, it is to be understood that the invention is not to be limited thereby, but is to include all

EXAMPLE 1

12.6 kg ammonium bichromate are dissolved in 60 l. of water and 16.8 l. of 25% ammonia solution is added. This solution is added, with stirring, to a preheated solution of 21.8 kg Cu $(NO_3)_2 \cdot 3H_2O$ and 2.6 kg Ba $(NO_3)_2$ in 80 l. of water. The product precipitated.

The precipitate obtained is separated from the liquid in a filtering flask; is dried in a dryer in air for 10 hours at 120° to 130°C; is subsequently comminuted and heated in this form for one hour to 350° to 400°C in a muffle furnace. The powdery starting material is then ground to a grain size of less than 60 microns.

Subsequently, 100 kg of an aluminum oxide press cake with an $Al_2O_3$ solids content of 6.7%, which was produced by subsequent precipitation of an aluminum sulfate solution with caustic soda and subsequent washing and squeezing out in a filter press, was mixed and homogenized for three hours in a kneader with 16 kg of the barium-doped oxides of copper and chromium (molar ratio 2 CuO: 1 $Cr_2O_3$: 0.13 Ba O). The paste is then dried for 12 hours in a box furnace on racks at 120°C, is then broken in a Pfleiderer strainer (sifter) with 2 mm insert; and subsequently is ground on a disk crusher to grain sizes below 50 microns. This product is henceforth called the "mix."

20 kg of mix are processed with 675 ml of nitric acid (density 1.3), 750 kg stearic acid and 7.35 kg of an aqueous 3% methylcellulose solution in an edge mill (pug mill) to a compactable mass and are molded in an extruder with a round extruder head of 50 mm diameter, which has 85 mandrels of 1 mm diameter each per $cm^2$, into extruded articles of 50 mm diameter and 500 mm length.

The extruded articles are then dried on racks at 120°C in a box furnace and they are subsequently cut to lengths of 100 mm by means of a separating disk. They are then heated in a tubular furnace while passing air over them, with gradually rising temperatures (10°C per hour) to 250°C, and are finally heated to 500°C at a temperature rise of 4°C per minute; and then are calcined for two hours at this temperature. The catalyst elements obtained are designated in the following pages by A. They have good mechanical strengths, as evidenced from a measurement of the pressure resistance. For their measurement, an instrument by J. Chatillon, model LPCM with a pressure stamp of 13 mm diameter was used. The catalyst elements had a pressure resistance of 20 kg. In comparison particularly hard gamma-$Al_2O_3$-honeycomb bodies of the same dimension can have a pressure resistance of 33 kg. The catalyst elements A thus are hardly behind customary ceramic carrier skeleton catalysts in practice with regard to pressure resistance.

EXAMPLE 2

3 liters of an aqueous nickel nitrate solution, which contains 3100 g Ni $(NO_3)_2 \cdot 6 H_2O$ are poured over 10 kg of the catalyst elements A, produced as in Example 1. After absorption of the liquid in the pores of the material of the molded body, the material is dried at 120°C in a drying cabinet and is then calcined at about 450°C in the tubular furnace while passing air over it. The preliminary product is subsequently final-calcined for two hours at 800°C in the muffle furnace. These catalyst elements are designated henceforth by B. According to the test described in Example 1 they have improved mechanical strengths.

Table 1

| Comparison of Pressure Resistance | |
|---|---|
| Molded Body | Pressure resistance (kg) |
| A | 20 |
| B | 25 |

EXAMPLE 3

15 kg $[CrCl_2 (H_2O)_4]$ Cl . $2H_2O$ are dissolved in 12 l. of water. Likewise, 7 kg $NH_4 VO_3$ are dissolved in 150 l. of water and 9.4 l. $NH_4$ OH 25% at 80°C. The ammonium vanadate solution is steamed down to 87 l., then $CrCl_3$ solution is added while stirring and is adjusted with about 9.5 l. of 25% ammonia to a pH of 6. The formed precipitate is evaporated to dryness on sheet metal, is dried at 120°C, washed 3 times with water, again dried at 120°C and finally reheated for 1 hour at 400°C.

100 kg of the aluminum oxide press cake, described in Example 1, with an $Al_2O_3$ solids content of 6.7% are mixed and homogenized in a kneader with 10 kg of the produced vanadium chromium oxide during three hours. Molding is carried on as in Example 1 with sufficient addition of aqueous 3% methyl cellulose solution so that a moldable mass develops and is maintained. The further processing into the catalyst elements is accomplished as in Example 1. The obtained catalyst elements will henceforth be designated by C. They contain 60% by weight vanadium chromium oxide and 40% by weight of aluminum oxide.

EXAMPLE 4

6680 g $(NH_4)_2 Cr_2O_7$ are dissolved in 31.8 l. $H_2O$ and then 9.81 l. of 25% ammonia is added. This solution is introduced while stirring into a preheated (about 50°C) solution of 11.56 kg cobalt nitrate in 16 l. $H_2O$, the precipitation product formed is heated to 50°C while stirring, is washed by decanting and draining off and is dried at 120°C. The mass thus obtained is then heated for 1 hour at 350°–400°C in the muffle furnace.

16 kg of the cobalt chromium oxide is mixed with 100 kg of the aluminum oxide press cake described in Example 1 and is molded to molded bodies as described in Example 1. The further processing to catalyst elements is as in Example 1. The finished catalyst elements contain 70% by weight cobalt chromium oxides and 30% by weight aluminum oxide; henceforth they are designated by D.

EXAMPLE 5

4610 g $(NH_4)_2 Cr_2O_7$ are dissolved in 21.9 l. $H_2O$ and then 6.14 l. of a 25% ammonia is added. This solution is added to a preheated approximately 50°C solution of 22,130 g Fe $(NO_3)_3 \cdot 9H_2O$ in 14.6 l. $H_2O$ with stirring, the resultant precipitation is heated to 50° while stirring, is washed by decanting and draining off and is dried at 120°C. The mass thus obtained, was reheated for 1 hour at 400°C in a muffle furnace.

10 kg of the iron chromium oxide are mixed with 100 kg of the aluminum oxide press cake described in Example 1 and are molded into molded bodies as described in Example 1. The further processing to catalyst elements is effected as in Example 1. The finished catalyst elements contain 60% by weight chromic iron oxide and 40% by weight of aluminum oxide; henceforth they will be designated by E.

EXAMPLE 6

6,860 g $(NH_4)_2 Cr_2O_7$ are dissolved in 32.6 l. $H_2O$ and then 9.14 l. of a 25% ammonia is added. This solution is added to a preheated (about 50°C) solution of 13,660 g Mn $(NO_3)_2 . 4H_2O$ in 21.8 l. $H_2O$ while stirring, the developed precipitation is heated to 50°C with stirring, is washed by decanting and draining off and is dried at 120°C. The mass thus obtained is reheated for 1 hour at 400°C in the muffle furnace.

8.2 kg manganese chromium oxide are mixed with 100 kg of the aluminum oxide press cake, described in Example 1 and molded into molded bodies as described in Example 1. The further processing to catalyst elements takes place as in Example 1. The catalyst elements contain 55 parts by weight of manganese chromium oxide and 45 parts by weight of $Al_2O_3$; henceforth they are designated by F.

EXAMPLE 7

1 kg of the catalyst elements B are saturated with 280 ccm of an aqueous solution of 15.35g $K_2$ $PdCl_4$ and 28g $K_2CO_3$ and are subsequently dried at 120°C on racks. The molded catalyst bodies are washed with 7.5 l. of water to which 35 ml of perhydrol were added. After renewed drying the molded bodies are reheated for 30 minutes in the air at 400°C.

Henceforth the catalyst elements are designated by G; they contain 0.5% Pd as PdO.

EXAMPLE 8

1 kg of catalyst element D are saturated with 280 ml of an aqueous $H_2PtCl_6$ and $RhCl_3$ solution, which contains 660 mg Pt and 330 mg Rh, and are dried subsequently on racks at 120°C. The molded catalyst bodies are subsequently treated in the hydrogen flow at 150°C. Then this is reheated in the air flow for 30 minutes at 400°C.

The catalyst elements are henceforth designated by H; they contain 0.1% impregnation of a noble metal at the ratio of Pt to Rh as 2:1.

EXAMPLE 9

The catalyst element B has a free gas penetration surface of 59%, a geometrical surface of 2.35 $m^2/dm^3$ and a specific surface of 65 $m^2/g$. The specific surface was measured by nitrogen absorption at the temperature of the liquid nitrogen according to the Brunauer, Emmett and Teller method. This molded body was tested for its catalytic effectiveness in a testing apparatus consisting of gas dosage arrangements, a reaction pipe, which was inserted in a temperature-programmed tubular furnace and analysing devices for the measurement of the gas components — individually, there are (a) an FID device for the hydrocarbons; (b) a gas chromatograph for the CO analysis and (c) an ion-specific electrode for the NO-measurement.

The reaction temperature amounted to 700°C. The volumetric speed (velocity) amounted to 25,000 N l.gas/h . l.catalyst. The test gas had the following composition:

3 Vol % CO
0.2 Vol % NO
1.1–6.0 Vol % $O_2$
the rest N2.

The conversions for carbon monoxide and nitricoxide for the above mentioned sample are contained in the following table. For a simplified presentation an oxygen number $p$ was defined, which was formed from the quotient: vol.% in exhaust/vol.% oxygen required for complete combustion of the combustible components. The quotient 1 designates the stoichiometric ratio, a number smaller than one of below stoichiometric oxygen portion, a number larger than one an above stoichiometric oxygen portion in the reaction gas.

The results show that the catalyst element, depending on the oxygen contents of the exhaust gas, is equally well suited for the removal of NO or CO. A very good conversion of NO will be achieved, for example, in the below stoichiometric area. With increasing oxygen concentration in the test gas mixture the conversion decreases again. The CO conversions grow with increasing oxygen content in the test gas and they reach almost 100% in the above stoichiometric area.

Table 2

CO and NO Conversion as a Function of the Oxygen Number $p$
GHSV=25,000 (NTP);
Reaction temperature 700°C

| Oxygen number $p$ | Conversion CO % | Conversion No. % |
| --- | --- | --- |
| 0.7 | 63 | 100 |
| 0.9 | 73 | 99 |
| 1.0 | 78 | 94 |
| 1.1 | 82 | 87 |
| 1.3 | 90 | 66 |
| 1.5 | 95 | 45 |
| 1.7 | 97 | 23 |
| 2 | 99 | 9 |
| 3 | 99 | 4 |
| 4 | 99 | 2 |

EXAMPLE 10

The reaction temperature described in Example 9, was used for the measurement of the starting behavior and the catalytic effect of the catalyst elements. The following test gas mixture was used:

3 Vol % CO
0.5 Vol % $C_3H_6$
4.13 Vol % $O_2$
Rest $N_2$

The volumetric speed was 5,000 N l.test gas/hr. . l.catalyst. The criterion "starting behavior" was defined by that temperature, at which the reaction mixture ignites, with which a clear rise in the gas temperature after the catalyst is connected. The results are summarized in Table 3.

The catalyst elements all show good conversions. The ignition behavior is improved by subsequent impregnation with noble metal. Particular improvements can be achieved, whenever the catalyst elements are treated subsequently with salts of iridium, or ruthenium.

Table 3

| Molded Body | Ignition Behavior and Catalytic Effect of the Catalyst Elements | | | |
|---|---|---|---|---|
| | Starting Temperature (°C) | Conversion CO (%) | $C_3H_6$ (%) | At Gas Temp. (°C) |
| A | 185 | 99.2 | 98.2 | 455 |
| B | 175 | 100 | 98.7 | 445 |
| C | 195 | 99.0 | 92.3 | 460 |
| D | 160 | 93.9 | 95.2 | 440 |
| E | 190 | 94.4 | 100 | 440 |
| F | 185 | 92.6 | 98.5 | 420 |
| G | 135 | 100 | 98.6 | 340 |
| H | 130 | 100 | 99.2 | 380 |

EXAMPLE 11

Catalyst element B (Starting temperature according to Table 3 = 175°C) was connected in a suitable container with a stationary engine and exhaust gas from the engine was allowed to flow through it for 24 hours at 870°C. Subsequently a starting test according to the method described in Example 10 was carried out. The starting temperature was found to be 195°C.

In comparison to this, now a carrier skeleton catalyst of a known type was tested. The latter was produced as follows: 200g molded body of the same dimension, same gas penetration surface and same geometrical surface from γ-aluminum oxide was saturated with 200 ml of an aqueous solution, which contained 23.7 g $CrO_3$ and 54.8 g $Cu(NO_3)_2 \cdot 3H_2O$, was dried at 120° and reheated for 1 hr at 450°C.

A skeleton carrier catalyst with 9% by weight of copper oxide — calculated as CuO and 9% by weight of chromium oxide — calculated as $Cr_2O_3$ — was obtained. It was also subjected to the above described stationary engine test. The starting behavior prior to and after the engine test was checked. The following values were found for the starting temperatures:

a. prior to engine test 175°C
b. after the engine test 380°C

The fresh catalysts differ only little in their oxidation effect. The catalyst B after use in the engine, is practically undamaged.

The comparison catalyst of a known type, to the contrary, shows a clear drop of its effectiveness after the 24 hour use in the engine. From that the superiority of the use of the system of the invention as compared to that of traditional carrier skeleton catalysts, which have a heavy metal oxide component of less than 50% by weight, becomes clear. The last mentioned carrier-skeleton catalysts are deactivated by solids reactions at higher temperature.

Thus, it is apparent that there has been provided, in accordance with the invention, a catalytic exhaust purifier, and method for producing said catalyst exhaust purifier that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A catalyst composition for purifying exhaust gases from motor vehicles and industrial plants, said composition in the form of a molded element, which element comprises a monolithic system of a mixed catalyst through which at least one channel passes, said mixed catalyst comprising a mixture of (a) catalytically active aluminum oxide, and (b) more than 50% by weight of said mixture consisting of two components, the first component being chromium oxide and the second component being an oxide of another element of the First Transition Series.

2. The catalyst composition of claim 1, wherein said aluminum oxide is a mixture of eta, gamma-aluminum oxide.

3. The catalyst composition of claim 1 wherein said element further includes a noble metal oxide.

4. The catalyst composition of claim 1 wherein the element of the First Transition Series includes vanadium, manganese, iron, cobalt, nickel or copper.

5. The composition of claim 1 which further includes another oxide of an element of the First Transition Series on the surface and in the pores of said monolithic system.

6. A packing for an exhaust purifier system, comprising a plurality of molded elements of claim 1.

7. A process of forming a mixed catalyst composition for purifying exhaust gases from motor vehicles and industrial plants, said composition comprising a. preparing a mixture of chromium oxide and an oxide of another element of the First Transition Series;

b. mixing said chromium oxide and oxide of an element of the First Transition Series with a catalytically active aluminum oxide so that the oxides of chromium and the element of the First Transition Series comprise more than 50% by weight of the aluminum oxide metal oxide compound mixture;

c. molding said aluminum oxide-chromium oxide-metal oxide of an element of the First Transition Series into a discrete element through which at least one channel passes, whereby the element so produced is a body of hard-baked catalytically active components.

8. The process of claim 7 wherein the element is further impregnated with a noble metal salts.

9. The process of claim 7 which further includes impregnating said element with an impregnant including a salts of an element of the First Transition Series.

10. The process of claim 7 wherein said catalytically active aluminum oxide is a mixture of eta and gamma aluminum.

11. The process of claim 7 wherein said mixtures of oxides of chromium oxide and an oxide of another element of the First Transition Series is prepared by precipitating a salt of chromium in the presence of a salt of an element of the First Transition Series, drying the precipitate, comminuting the precipitate and calcining the precipitate.

12. The process of claim 7 wherein molding is effected by extrusion.

13. The process of claim 11 wherein said aluminum oxide is in the paste form.

14. The process of claim 11 wherein said precipitate is comminuted to particle sizes less than 70 microns.

15. The process of claim 11 wherein said precipitate is comminuted to particle sizes of less than 60 microns.

* * * * *